April 11, 1939.  A. M. LANG  2,153,894
SEDIMENT SAMPLER
Filed Jan. 13, 1938    2 Sheets-Sheet 1
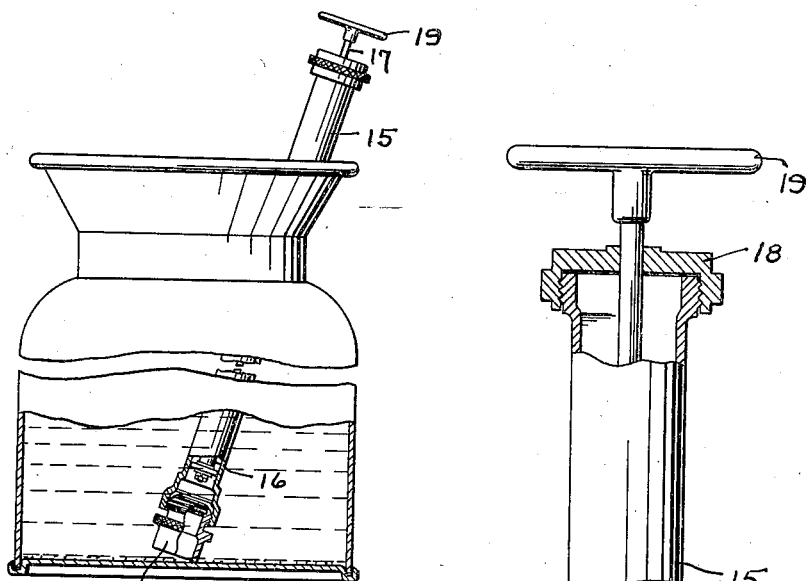
Fig. 2
Fig. 6
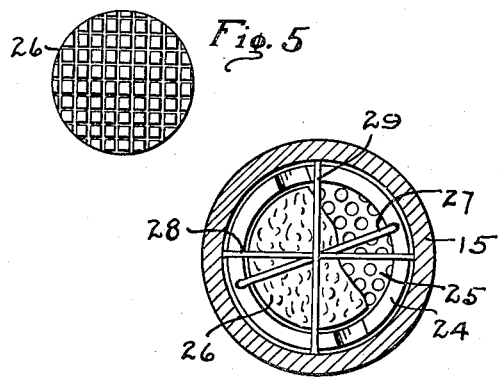
Fig. 5
Fig. 4
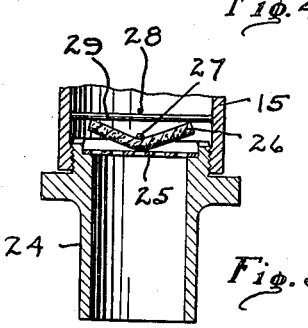
Fig. 3
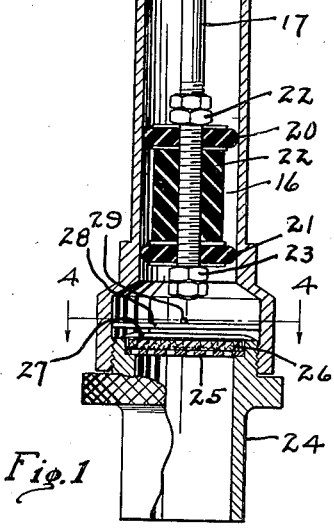
Fig. 1
Inventor
Adam M. Lang,
By Minturn & Minturn,
Attorneys April 11, 1939.  A. M. LANG  2,153,894
SEDIMENT SAMPLER
Filed Jan. 13, 1938  2 Sheets-Sheet 2
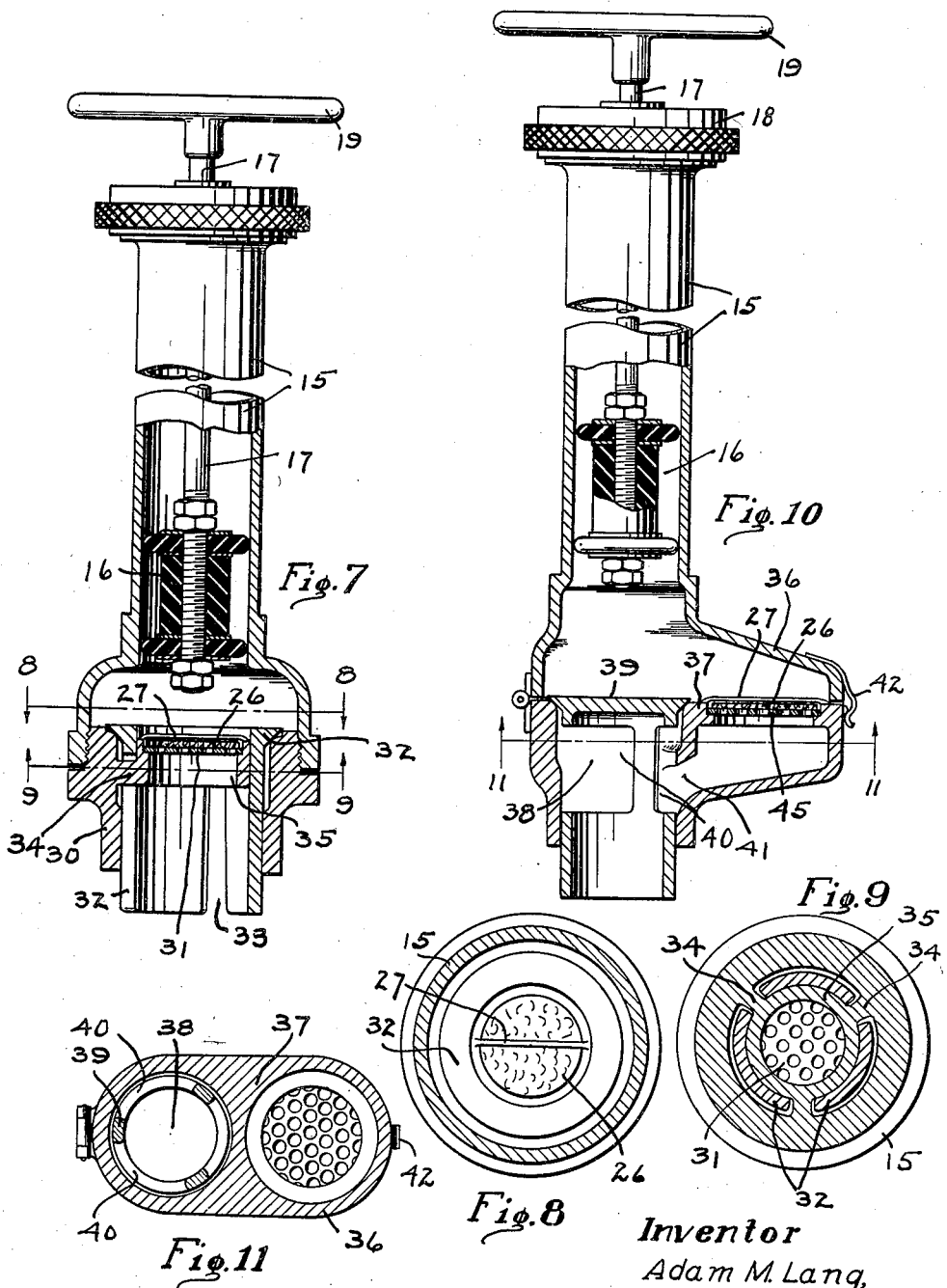
Inventor
Adam M. Lang,
By Minturn & Minturn,
Attorneys Patented Apr. 11, 1939

2,153,894

UNITED STATES PATENT OFFICE 2,153,894

SEDIMENT SAMPLER

Adam M. Lang, Indianapolis, Ind., assignor to Langsenkamp Wheeler Brass Works, Inc., Indianapolis, Ind.

Application January 13, 1938, Serial No. 184,817

2 Claims. (Cl. 73—51)

This invention relates to means for taking a sample of milk from a vessel and filtering that sample through a pad in order to determine the relative amount of sediment or finely divided foreign matter appearing in the sample.

A primary object of the invention is to provide an exceedingly simple device for the purpose above indicated which will not only be simple in operation but will permit ready insertion of the filter pad; permit easy disassembly of the device for cleaning; and will permit the sample to be drawn from directly off of the bottom of the milk containing vessel.

These and other objects and advantages of the invention will become apparent to those versed in the art in the following description of the invention as illustrated by the accompanying drawings, in which Fig. 1 is a side elevation in partial section of a structure embodying the invention;

Fig. 2, a side elevation of the structure in position for drawing a sample;

Fig. 3, a detail of the lower end of the device in central vertical section revolved 90 degrees from the position shown in Fig. 1;

Fig. 4, a transverse section on the line 4—4 in Fig. 1 on an enlarged scale;

Fig. 5, a bottom plan view of a filter pad;

Fig. 6, a central vertical section through the filter pad;

Fig. 7, a side elevation of a modified form of the device in partial section;

Fig. 8, a transverse section on the line 8—8 in Fig. 7;

Fig. 9, a transverse section on the line 9—9 in Fig. 7;

Fig. 10, a side elevation in partial section of a still further modified form of the invention; and Fig. 11, a transverse section on the line 11—11 in Fig. 10.

Like characters of reference indicate like parts throughout the several views in the drawings.

Referring first to that form as illustrated in Figs. 1-6, a cylindrical barrel 15 is provided with a piston or plunger 16 which may be reciprocated in the barrel by means of the plunger rod 17 interengaging the plunger 16 by its lower end and extending out through a barrel head 18 to carry a handle 19 as a means for shifting the rod. Preferably the inside diameter of the barrel 15 and the permissible length of travel of the plunger 16 therein is made to be such that when the handle 19 is pulled upwardly to its limit of travel, a definite quantity of milk will have been drawn into the barrel, for example, a pint of milk. This volume, of course, may be varied in accordance with the requirements for the quantity of sample to be taken.

The plunger 16 may assume a number of forms suitable for use in the presence of milk. One suitable form is that as indicated in the drawings wherein the plunger comprises a pair of rubber disks 20 and 21 spaced apart by a cylinder of rubber 22 of external diameter smaller than that of the disks 20 and 21. These elements centrally receive the lower end of the rod 17 therethrough and may be compressed by upper and lower compression nuts 22 and 23 as a means of increasing the diameter of the disks to provide for closer fitting within the barrel.

The lower end of the barrel 15 is formed to detachably receive a foot 24. The particular form of attachment herein shown is by means of screw threads. The foot 24 is essentially a cylindrical barrel with a continuous passage therethrough axially aligned with the barrel 15. Across the upper or inner end of the passageway in the foot 24 is provided some suitable support 25 on which a filter disk or pad 26 may be carried. Preferably the support 25 has its upper face dropped down into a recess within the end of the foot 24, the diameter of the recess being but slightly larger than the diameter of the pad 26, a circular pad being herein shown.

This pad support 25 has one primary characteristic and that is that it has sufficient openings of proper dimensions as will permit the ready flow therethrough of the foreign matter found in the milk. In the form herein shown, this support 25 constitutes a disk of perforated metal having a plurality of holes therethrough. The filter pad 26 is placed on the support 25 when the foot 24 is removed from the barrel 15. In order to retain the pad in position, a cross wire 27 is provided to extend diametrically against the upper end of the foot 24 and be united thereto by its ends. The depth of the recess in the upper end of the foot 24 between the inner or top end of the foot 24 and the top side of the support 25 is made to be slightly in excess of the thickness of the filter pad 26 so that the pad may be inserted easily within that recess and slipped under the wire 27 without having to be forced. However, the wire 27 is in close proximity to the upper side of the pad when the pad is thus positioned in order that the pad will not be displaced when the foot 24 is being attached to the barrel and also when the device is being operated.

The pad 26 is preferably made out of a suitable filtering medium, cotton being one material well suited for the purpose. The pad is further preferably formed to have its underside of a denser nature than is the upper portion. This difference in density may be accomplished by embossing the pad from one side as indicated in Fig. 6 by the cross-like depressions. The pad is inserted in the end of the foot 24 with the denser or harder side placed downwardly in contact with the support 25.

In operation, the barrel is inserted in the milk vessel, a can, as indicated in Fig. 2, to have the foot 24 contact the floor of the vessel. The handle 19 is then pulled upwardly while the foot 24 remains in its floor contacting position so that the barrel 15 may be filled with milk. In the structure above described, this flow of milk upwardly through the foot 24 into the barrel 15 may only be had through the holes or openings in the pad support 25. During this upward flow, the pad 26 will be lifted to fold upwardly about the cross wire 27 as indicated in Fig. 3. This lifting action on the pad itself, of course, permits the entrance of the milk into the barrel without causing the milk to flow through the pad. Since the underside of the pad is preferably compressed to give the denser or harder surface, this surface will, of course, aid in resisting flow of milk upwardly through the pad and at the same time will serve as a means to prevent tearing or washing apart of the pad. Upward folding of the pad may be limited by suitable stop means. In the form herein shown, this stop means comprises a pair of crossed wires 28 and 29 secured in crossed diametric relation within the lower end of the barrel 15. The cross wires 28 and 29 are transversely positioned within the barrel end at the desired upper limiting positions of the folded edges of the pad 26, one such position being indicated in Fig. 3.

After the milk has been drawn upwardly into the barrel 15 as above indicated, the handle 19 is pushed downwardly to cause the milk to then flow back downwardly through the pad 26 then serving as a filter. The pad 26 will thus resume its flat position resting over the entire area of the perforated support 25 when the upward flow of milk ceases in taking the sample. The device is preferably lifted from the can, although not necessarily so, forcing the milk out of the barrel through the pad 26. After the milk has thus been expelled from the barrel through the pad 26 the foot 24 is detached from the barrel end and the pad 26 lifted out and a new pad put in for the next test. The lifted out pad may then be examined to determine the amount of foreign matter remaining on its top surface.

It is to be seen that in the structure thus far described, an extremely simple sampler is presented in that there are no working parts such as valves that have to be shifted and later removed for cleansing purposes. In fact there is no valve in the device at all and the milk is merely pulled into the barrel and expelled, flowing first around the pad and then back down through it. While the above description has been made in reference to sampling milk, the invention is, of course, not limited in its use thereto since it is equally well adapted for sampling other fluids which may be filtered through pads.

Referring now to that form of the invention as shown in Figs. 7-9, the same type of barrel 15 is employed with the same type of plunger to be reciprocated by the externally presented handle 19. In this form, however, a different type of foot 30 is detachably secured to the lower end of the barrel 15, this lower end in this instance flaring out to a larger diameter than in the first above described structure. The foot 30 carries an axial passageway therethrough to have a foraminated floor 31 across its upper end on which the filter pad may rest in the same manner as it does on the floor 25 for the first above described structure. The wire 27 is provided diametrically across and above the floor 31 to permit insertion of the pad 26 thereunder. Concentrically surrounding the pad 26 is an annular collar 32 which may reciprocate longitudinally in the passageway through the foot 30. This collar 32 is provided with longitudinal slots 33 which straddle necks 34 of the foot 30 extending horizontally across to support the inner fixed collar 35 which carries th pad floor 31. In other words, the collar 32 may be shifted upwardly and downwardly but the location of the pad floor 31 remains fixed.

The upper end of the collar 32 is flared outwardly to form a valve head seating on an annular shoulder provided around the upper end of the foot 30. The inside of the foot 30 is counterbored for a distance below the shoulder on which the valve head may rest so that when the collar 32 is pushed upwardly in the foot 30, the fluid being sampled may flow laterally through the slots 33 into that counterbored portion around the outside of the collar 32 and thence upwardly around the valve head on the collar into the barrel 15 above. The collar 32 is preferably made to extend below the lower end of the foot 30 when the upper valve head is seated on the foot shoulder as indicated in Fig. 7. This extension is provided as a means for contacting the bottom of the vessel containing the fluid to be sampled so that as the barrel 15 is lowered, the collar 32 will be pushed upwardly so as to open the passageway for flow of the fluid around under the valve head rather than directly through the floor 31. Of course, if the plunger in the barrel 15 is pulled upwardly too rapidly, fluid will cause the pad 26 to lift and fold somewhat about the wire 27 as in the action described in the structure first set out.

In the other form of the invention as illustrated in Figs. 10 and 11, the filter pad 26 rests at all times on its supporting floor 45. In this form, the lower end of the barrel 15 is provided with an offset leg 36 having a transverse floor 37 with a fluid passageway therethrough intercepted by the pad support floor 45. Axially aligned with the barrel 15 is a passageway 38 extending on down through the foot and in this passageway is a valve member 39 having a head normally seated around an annular shoulder of the upper opening of the passageway 38 through the floor 37. This valve member 39 has a hollow cylindrical portion hanging from the head in sliding fit with the lower portion of the passageway 38. The cylinder portion is provided with windows 40, herein shown as three in number, Fig. 11, which normally register with a lateral opening 41 into a passageway directed around and up toward the floor 45, Fig. 10. The vertical length of the windows 40 is made to be such that when the valve 39 is lifted, the solid wall portion of the valve therebelow will come up and close off the lateral passageway 41 and thus prevent any flow of the liquid around and through the pad support 45 and thereby insure flow of all the liquid upwardly and around the valve head into the barrel 15. The length of the valve member 39 is made to be such that an appreciable length normally extends from the foot whereby that valve member may be first brought into contact with the floor of the vessel containing the fluid and thus be carried upwardly for the initial intake of the fluid into the barrel 15.

In the form herein shown, the valve 39 and the pad 26 are both carried in a lower portion of the foot hinged to the lower head of the barrel 15 and detachably held in closed position by any such means such as a spring latch 42. In this form, there is no upward flow of the fluid against the underside of the pad 26 so that the pad is not disturbed in the least upon taking the sample and furthermore there is no possibility of some of the sediment becoming lodged on the underside of the pad on the intake flow.

While I have herein shown and described my invention as now best known to me, it is obvious that structural variations may be employed without departing from the spirit of the invention and I therefore do not desire to be limited to those precise forms beyond the limitations as may be imposed by the following claims.

I claim:

1. In a sediment sampler of fluids, a chamber, a filter pad carrier detachably secured across the lower end of said chamber, said carrier having a foraminated floor spaced below its top end to define a filter pad receiving and locating pocket in the top end of the carrier, a transverse bar carried by said carrier in spaced relation above said floor, between which floor and bar said pad is inserted and retained and peripherally located by said pocket side wall, and means for selectively creating a suction and a pressure in said chamber, and a transverse bar carried by said chamber spaced above said pad and angularly displaced in relation to said pad restraining bar for limiting the lifting of said pad about its restraining bar to prevent contact one with the other of the upturned portions.

2. In a sediment sampler of fluids, a chamber, a filter pad carrier detachably secured across the lower end of said chamber, said carrier having a foraminated floor spaced below its top end to define a filter pad receiving and locating pocket in the top end of the carrier, a transverse bar carried by said carrier in spaced relation above said floor, between which floor and bar said pad is inserted and retained and peripherally located by said pocket side wall, and means for selectively creating a suction and a pressure in such chamber, said pad being formed to have a dense under portion and a less dense upper portion, whereby the pad will initially offer sufficient resistance to fluid flowing into said chamber to cause it to lift promptly under suction and avoid any substantial up-flow of fluid through the pad and still permit the pad to seat under internal pressure and have said fluid filter back therethrough.

ADAM M. LANG.